United States Patent [19]

Breuhan

[11] Patent Number: 5,380,051
[45] Date of Patent: Jan. 10, 1995

[54] FORCE ASSISTED TUBE CONNECTOR

[75] Inventor: Ronald G. Breuhan, Farmington Hills, Mich.

[73] Assignee: Ford Motor Company, Dearborn, Mich.

[21] Appl. No.: 86,067

[22] Filed: Jul. 6, 1993

[51] Int. Cl.⁶ .......................................... F16L 37/084
[52] U.S. Cl. ................................. 285/307; 285/320; 285/316; 285/319
[58] Field of Search ............... 285/23, 307, 308, 313, 285/317, 318, 319, 320, 316

[56] References Cited

U.S. PATENT DOCUMENTS

| | | | |
|---|---|---|---|
| 1,871,836 | 8/1932 | Bradford | 285/320 |
| 2,409,650 | 10/1946 | Wiggins | 285/320 |
| 2,757,942 | 8/1956 | Eberhart | 285/7 |
| 2,887,124 | 5/1959 | Mehl | 285/320 |
| 2,888,278 | 5/1959 | Torres et al. | 285/313 |
| 2,914,344 | 11/1959 | Anthes | 285/93 |
| 2,939,728 | 6/1960 | Bitel | 285/315 |
| 2,952,482 | 9/1960 | Torres | 285/320 |
| 2,973,211 | 2/1961 | Osborn | 285/320 |
| 3,240,520 | 3/1966 | Dailey et al. | 285/320 |
| 3,339,947 | 9/1967 | Maisey | 285/315 |
| 3,439,944 | 4/1969 | Leutenegger | 285/321 |
| 3,680,893 | 8/1972 | Giraud | 285/320 |
| 3,700,112 | 10/1972 | Maeshiba | 210/445 |
| 3,884,508 | 5/1975 | Jones | 285/320 |
| 3,918,679 | 11/1975 | Sievana | 251/149.1 |
| 4,055,359 | 10/1977 | McWethy | 285/39 |
| 4,376,525 | 3/1983 | Frémy | 251/149.6 |
| 4,401,326 | 8/1983 | Blair | 285/318 |
| 4,632,434 | 12/1986 | Proctor et al. | 285/39 |
| 4,641,859 | 2/1987 | Walters | 285/27 |
| 4,647,082 | 3/1987 | Fournier et al. | 285/315 |
| 4,783,101 | 11/1988 | Peterson et al. | 285/319 |
| 4,804,290 | 2/1989 | Balsells | 403/326 |
| 4,844,859 | 7/1989 | Coussau | 285/320 |
| 4,850,622 | 7/1989 | Suzuki | 285/286 |
| 4,872,710 | 10/1989 | Konecny et al. | 285/81 |
| 4,906,031 | 3/1990 | Vyse | 285/318 |
| 4,923,228 | 5/1990 | Laipply | 285/319 |
| 5,002,314 | 3/1991 | Smith | 285/12 |
| 5,005,877 | 4/1991 | Hayman | 285/315 |
| 5,094,494 | 3/1992 | McConnell | 285/318 |
| 5,195,787 | 3/1993 | Bartholomew | 285/319 |
| 5,215,122 | 6/1993 | Boyers et al. | 137/614.04 |

FOREIGN PATENT DOCUMENTS

| | | |
|---|---|---|
| 0340194 | 11/1989 | European Pat. Off. |
| 0474335 | 3/1992 | European Pat. Off. |
| 1277984 | 10/1961 | France |
| 2905035 | 8/1979 | Germany |

Primary Examiner—Eric K. Nicholson
Attorney, Agent, or Firm—Roger L. May; Raymond L. Coppiellie

[57] ABSTRACT

A connector and method is provided for coupling sections of tubing 102, 104 together wherein each of the tube sections 102, 104 includes a respective connector member 106, 108 attached at an end thereof. The second connector member 108 has a spring 111 associated therewith for providing an axial force to assist in fully engaging the two connector members 106, 108 upon introduction of the first connector member 106 into the second connector member 108. A plurality of load members 112 hold the spring 111 in a compressed state prior to the coupling of the connector members 106, 108. As the connector members 106, 108 are coupled, the spring 111 is released and a plurality of latch pins 116, connected to the load members 112, engage a circumferential flange 120 on the first connector member 106. The force of the spring 111 is thus translated to the first connector member 106 to assist in the insertion of the first connector member 106 into the second connector member 108. The latch pins 116 may include curved tab portions 116a which extend through the housing 109 of the connector 100 to hold the tubes 102, 104 in the engaged position. To release the tubes 102, 104, the tab portions 116a are pressed downward toward the center axis of the connector 100.

20 Claims, 7 Drawing Sheets

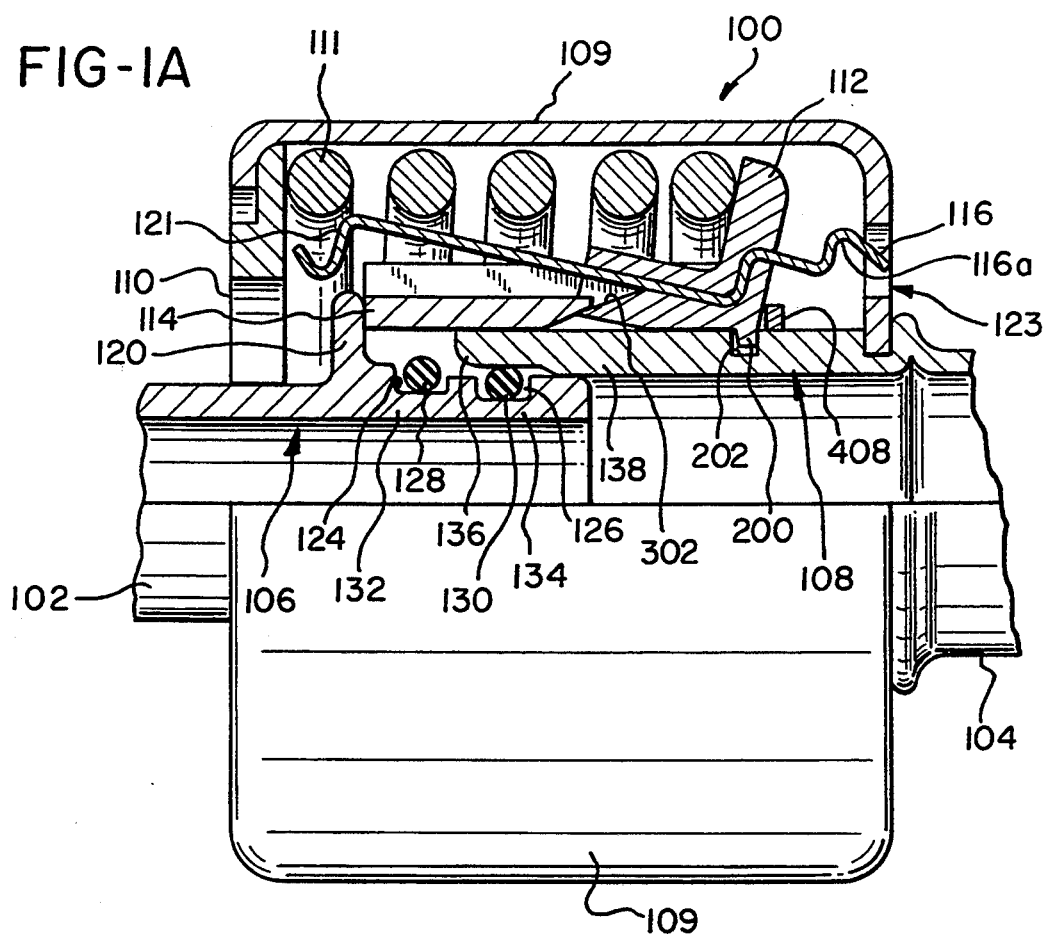
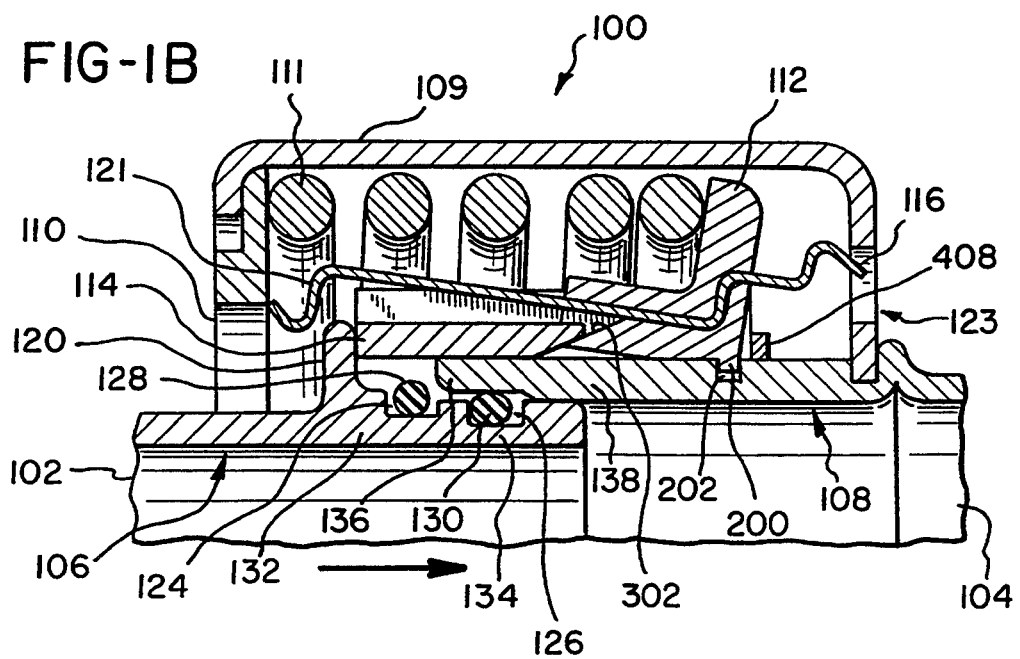

FORCE ASSISTED TUBE CONNECTOR

BACKGROUND OF THE INVENTION

The present invention relates generally to connectors for coupling sections of tubing together, and more particularly, to a connector and method for coupling a pair of connector members wherein one of the connector members provides an axial force co fully engage or assist in fully engaging the two connector members.

During the assembly of a motor vehicle, quick connect tube couplings are commonly used to interconnect fuel lines, cooling system lines, and the like where it is desirable to perform reliable assembly as quickly as possible. Typically, a basic coupling includes a female connector member adapted to hermetically receive a male connector member therein. Interconnection of the connector members is achieved by forcing the members together and is maintained by a latch structure which is typically activated upon substantially complete interconnection. Examples of such quick connect coupling assemblies are shown in U.S. Pat. Nos. 4,647,082 and 4,923,228. Coupling assemblies may also include latch release arrangements to facilitate uncoupling the respective members if desired or necessary. An example of a connector incorporating a release mechanism is disclosed in U.S. Pat. No. 4,647,082.

Up to this time, the connector members have been engaged manually during the assembly process. An assembly worker grasps each of the tubes to be coupled and physically forces the male and female connector members together. Any impediment to the coupling process, such as tube misalignment or sliding friction in the coupling joint must be overcome by the assembly worker increasing the coupling force.

Significantly, previous coupling assemblies have not been entirely successful in addressing the problems resulting from this labor intensive task. For instance, assembly workers, accustomed to a required level of force for complete connections, may inadvertently not completely connect stubborn coupling assemblies. Further, due to the force required, these workers can experience unnecessary fatigue which may result in incomplete connections during the assembly process. The additional time needed to assure a complete connection increases the assembly time resulting in loss of production. Connection problems can be compounded by connector members incorporating O-ring seals which require an even greater coupling force since the seals must be compressed during the coupling operation to assure a hermetically sealed connection.

It is thus apparent that a need exists for a connector which overcomes these problems to more reliably assure complete connections of tube coupling assemblies.

SUMMARY OF THE INVENTION

The present invention satisfies this need by providing a connector and method for applying an axial force to assist the manual force which has been used to couple tube connector members to one another. In the illustrated embodiment, a spring is associated with one of the connector members. The spring is compressed prior to interconnection of the connector members to a triggering point which releases the compressed spring and transfers the energy thereof to exert an axial force tending to fully couple the connector members. This spring force assists a manual force to ease the assembly operation, thus better assuring a reliable complete connection of the connector members.

In accordance with one aspect of the present invention, first and second tubes have respective first and second connector members at ends thereof. The second connector member is adapted to receive the first connector member and has a force means associated therewith. The force means applies an axial force to the first connector member which is sufficient to at least assist in fully engaging the first connector member and the second connector member upon introduction of the first connector member into the second connector member. The force means may include a compression spring for generating the axial force and translation means for transferring the axial force from the spring no the first connector member.

In accordance with another aspect of the present invention, a method is provided for coupling a first tube having a first connector member connected to an end thereof and a second tube having a second connector member connected to an end thereof. The second connector member is adapted to receive the first connector member. The method comprises the steps of: coupling a force means to one of said connector members; enabling said force means such that said force means generates an axial force to assist coupling of said first and second connector members when said second connector member receives said first connector member; and introducing said first connector member into said second connector member whereby said axial force generated by said force means assists in coupling said first and second connector members. Preferably, the step of coupling a force means comprises the step of providing a spring connected to one of the connector members.

It is thus a feature of the present invention to provide an improved connector and method for coupling a pair of tubes wherein a force generated by a spring associated with one of the tubes assists in fully engaging the tubes.

Other features and advantages of the present invention will be apparent from the following description, the accompanying drawings and the appended claims.

BRIEF DESCRIPTION OF THE DRAWINGS

FIG. 1A is a partially sectioned side view of a first embodiment of a connector in accordance with the present invention wherein the respective connector members are in an engaged but fully uncoupled position;

FIGS. 1B through 1E are partial, sectioned side views of the connector of FIG. 1A progressively illustrating the coupling process;

DETAILED DESCRIPTION OF THE INVENTION

Figure 1C:
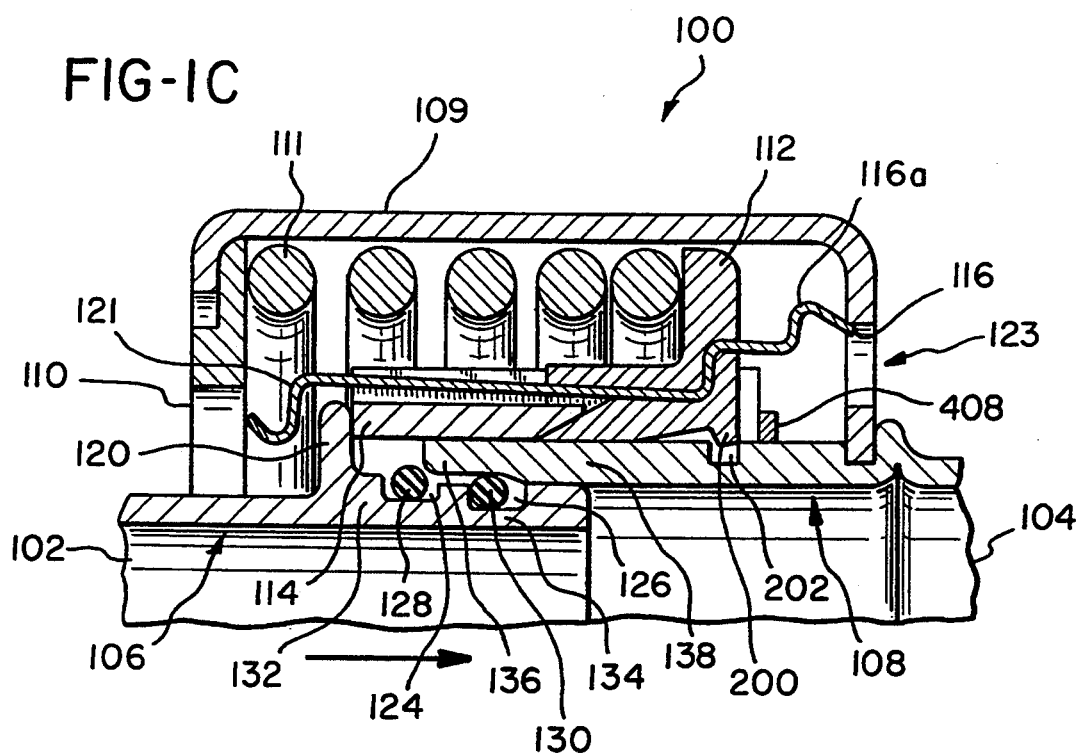

A partially sectioned side view of a connector 100 in accordance with a first embodiment of the present invention is shown in FIG. 1A. The connector 100 couples a first tube 102 and a second tube 104 and is shown in FIG. 1A in an engaged but fully uncoupled position. A first connector member 106 is provided at one end of the first tube 102 for insertion into a second connector member 108 provided at one end of the second tube 104. Coupling movement of the members 106, 108 from an uncoupled position to a fully coupled position is shown in FIGS. 1A-1E.

A force means, retained in a generally cylindrical housing 109 and associated with the second connector member 108, applies an axial force to the first connector member 106 to assist in fully engaging the first and second connector members 106 and 108. As will be apparent to skilled in the art, the force means can take a variety of forms and can be associated with either connector member. The housing 109 includes an insertion opening 110 into which the first connector member 106 is inserted.

In the first illustrated embodiment, the force means comprises a compression spring 111 which is positioned about the second connecting member 108 to generate the axial force assisting the coupling of the connector members 106 and 108. Translation means, which includes a plurality of load members 112, a plurality of slidable wedge members 114 and a plurality of latch pins 116, transfers the axial force from the spring 111 to the first connector member 106.

Figure 4:
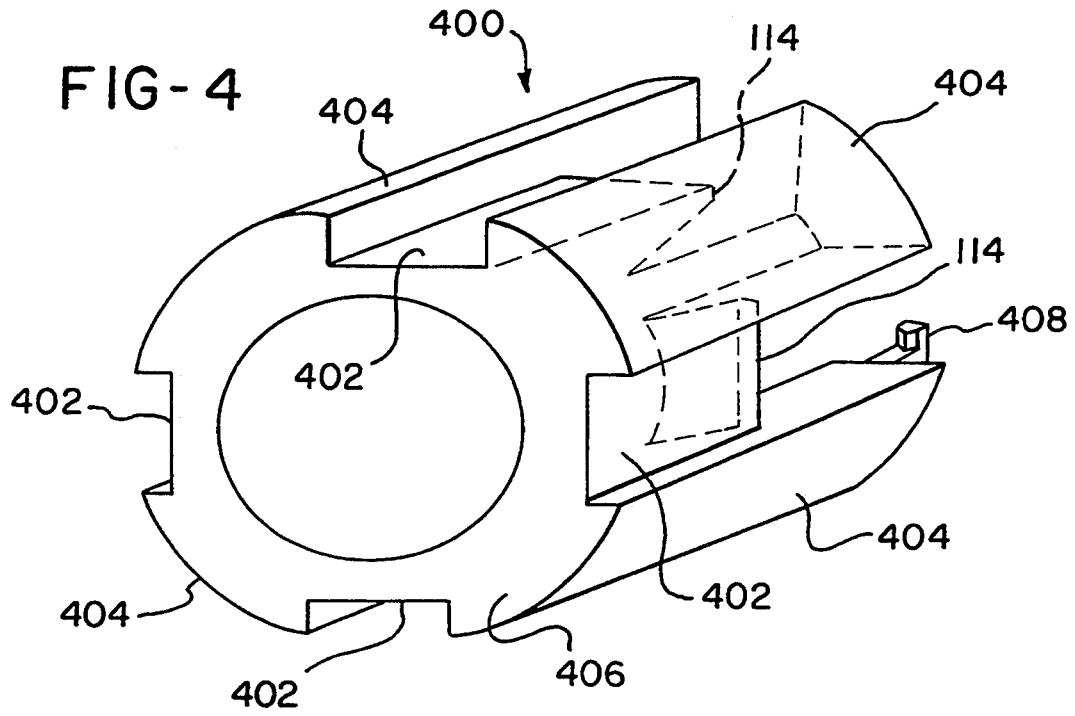
FIG.4 is a perspective view of a collar of the connector of FIG. 1A illustrating positions of wedge members on the collar.

The plurality of wedge members 114 are, as shown in FIG. 4, integrally formed in a molded collar 400. The four wedge members 114 define associated alignment grooves 402 bounded by retaining portions 404. The wedge members 114, grooves 402 and retaining portions 404 align and guide the movement of associated load members 112 and latch pins 116 during the coupling operation, as is more fully described below. A flat face 406 of the collar 400 interacts with a circumferential flange 120 on the first connector member 106 during the coupling of the tubes 102 and 104. Although the illustrated collar 400 is shown being adapted to accommodate four latch pins, it should be readily appreciated that the collar 400 may be designed for any reasonable number of latch pins.

Figure 3:
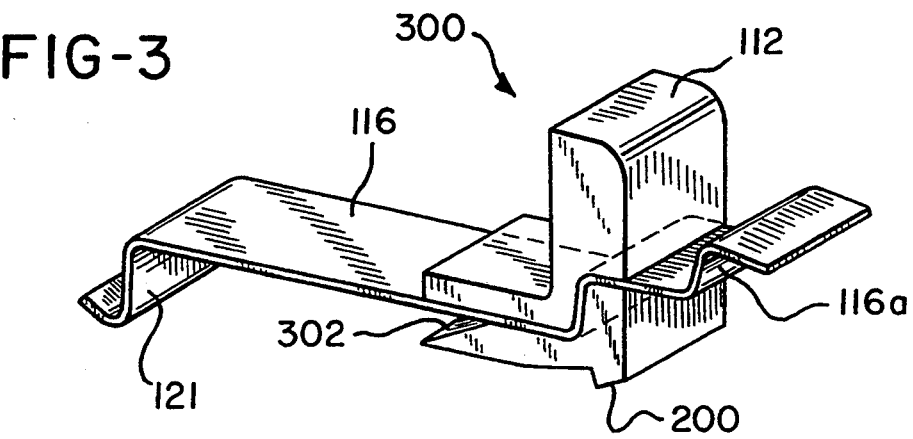
FIG. 3 is a perspective view of a pin assembly of the connector of FIG. 1A showing the latch pin disposed in the load member.

A pin assembly 300 comprised of the latch pin 116 disposed in the load member 112 is shown in detail in FIG. 3. The pin assembly 300 is positioned in the alignment grooves 402 such that a sloped face 302 on the load member 112 interacts with the wedge member 114. When the pin assembly 300 is positioned in the collar 400, a hook 121 formed in the latch pin 116 extends beyond the flat face 406 of the collar 400 to restrict the movement of the pin assembly 300 in the groove 402. Tabs 408 positioned at the ends of the retaining portions 404 opposite the flat face 406 of the collar 400 to further restrict the movement of the pin assembly 300 in the groove 402.

Figure 2:
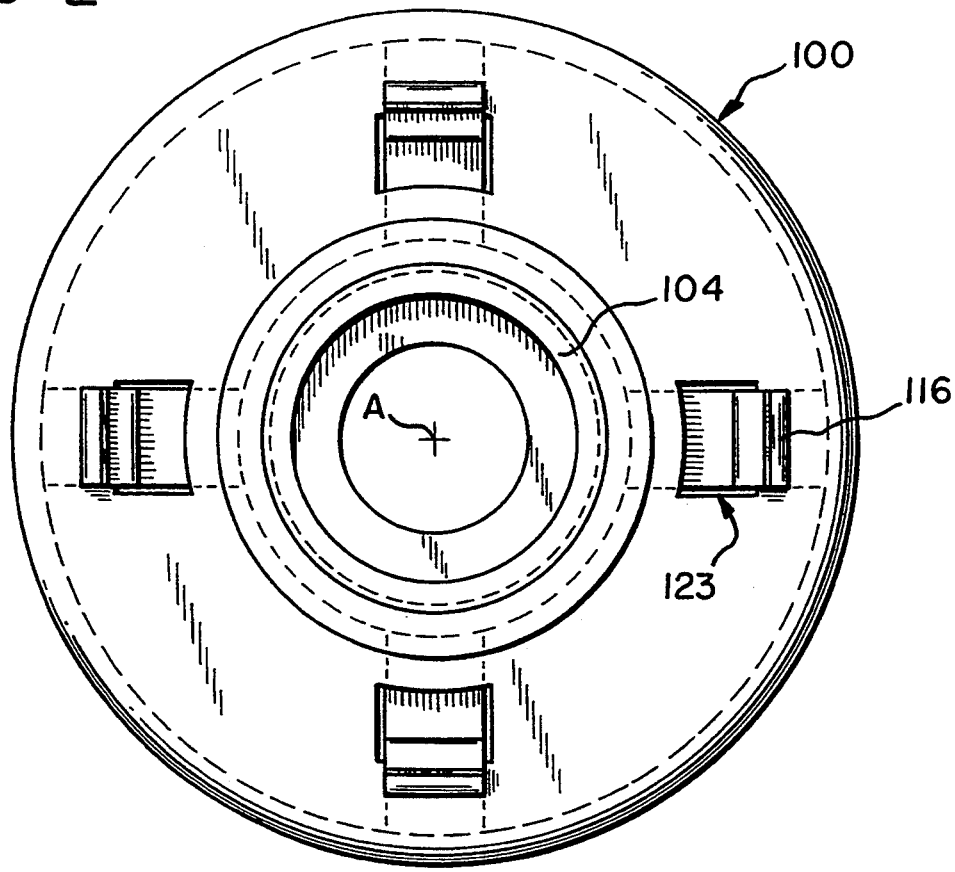
FIG. 2 is an end view of the connector of FIG. 1A taken along the second tube.

The latch pins 116 also each include a curved tab portion 116a which extends through a corresponding disconnect opening 123 in the housing 109 when the connector 100 is fully coupled. As shown in FIG. 2, the disconnect openings 123 are evenly spaced around the housing 109. The curved tab portions 116a contact the outer perimeter of the disconnect openings 123 and, therefore, prohibit withdrawal of the latch pins 116 through the disconnect openings 123 unless the curved tab portions 116a are all simultaneously forced toward the axial center line A of the connector 100.

The first connector member 106 may also include a pair of circumferential grooves 124 and 126 which receive a pair of O-rings 128 and 130 therein for sealing the first connector member 106 to the second connector member 108 when the connector 100 is fully coupled. The O-rings 128 and 130 are sized so that they are compressed between the first and second connector members 106 and 108 to produce the requisite seal. As shown in FIGS. 1A-1E, the first connector member 106 has a first section 132 with a first outer diameter and a second section 134 with a second outer diameter. The first outer diameter is larger than the second outer diameter to facilitate insertion of the first connector member 106 into the second connector member 108.

The second connector member 108 includes first and second portions 136 and 138 having first and second inner diameters, respectively. When coupled to the second connector member 108, the first section 132 and O-ring 128 are positioned substantially adjacent to the first portion 136, and the second section 134 and O-ring 130 are positioned substantially adjacent the second portion 138. Preferably, the first inner diameter of the first portion 136 exceeds the second outer diameter of the second section 134 to facilitate coupling the connector 100.

FIG. 2 is an end view of the connector 100 of FIGS. 1A-1E viewed along the second tube 104. As noted above, when coupled, the curved tab portions 116a of the latch pins 116 extend through the disconnect openings 123 and must be forced inwardly, i.e. toward the axial center line A of the second tube 104, in order to be withdrawn from the openings 123. As shown in the illustrated embodiment of FIG. 2, four latch pins 116 are evenly distributed around the center axis of the second tube 104; however, any reasonable number of latch pins 116 may be provided.

The coupling process of the first embodiment of the connector 100 will now be described with reference to FIGS. 1A-1E which show the operation of one of the load members 112 and one of the latch pins 116 during the coupling of the first and second connector members 106 and 108. It should be understood that each load member 112 and latch pin 116 positioned in the connector 100 operates in substantially the same manner.

First connector member 106 has been partially inserted into the second connector member 108 in FIG. 1A. The load member 112 has a protrusion 200 which is initially engaged in a circumferential notch 202 formed on the outer surface of the second tube 104 to retain the spring 111 in a compressed state. With the protrusion 200 in the notch 202, the load member 112 is tilted due to the force of the compressed spring 111 such that the curved tab portion 116a of the latch pin 116 is sloped downward, as shown in FIG. 1A, toward the center axis of the second tube 104. The hook 121 of the pin 116 is raised by the force of the spring 111 to avoid contacting the circumferential flange 120 on the first connector member 106. The tab 408 secures the collar 400 to the pin assembly 300. Movement of the collar 400, and thus the wedge member 114, along the center axis of the second tube 104 forces the load member 112 downward and backward due to the interaction of the wedge member 114 with the sloped face 302 of the load member 112.

The second O-ring 130 is shown in contact with the inner diameter of the first portion 136; however, this is not necessary for effective sealing of the connector 100. In order to provide a secure seal of the interconnection of the first and second connector members 106 and 108, the first and second O-rings 128 and 130 are compressed between the inner diameter of the first or second portions 136 and 138 of the connector member 108 and the grooves on the first and second sections 132, 134 of the connector member 106, respectively, when the first and second connector members 106 and 108 are fully engaged.

As the first connector member 106 is further inserted into the second connector member 108, as shown in FIG. 1B, the flange 120 passes fully beyond the hook 121 and the wedge member 114 engages the sloped face 302 of the load member 112. The interaction of the wedge member 114 and the sloped face 302 rotates the load member 112 to lower the hook 121 to engage the flange 120. The forced rotation of the load member 112 also begins to lift the protrusion 200 from the notch 202.

The action of the wedge member 114 against the load member 112 as the first connector member 106 is further inserted into the second connector member 108 moves the member 112 to the position shown in FIG. 1C. The hook 121 of the pin 116 continues to lower over the flange 120 and the protrusion 200 is almost completely released from the notch 202.

Figure 1D:
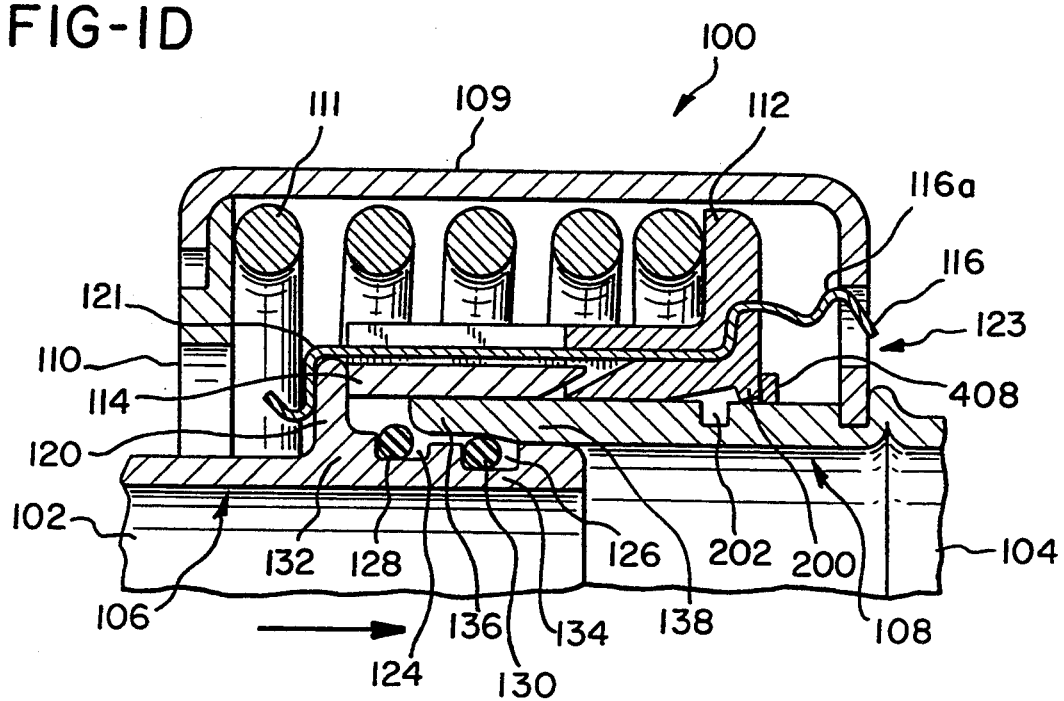

FIG. 1D shows the connector 100 just prior to the complete coupling of the first and second connector members 106 and 108. Protrusion 200 has been completely removed from the notch 202 and the compressed spring 111 has forced the load member 112 forward at a rate greater than the insertion rate of the first connector member 106. Thus, the sloped face 302 of the load member 112 separates from wedge mender 114. Curved tab portions 116a of the latch pins 116 are forced downward by the perimeter of the disconnect opening 123.

Figure 1E:
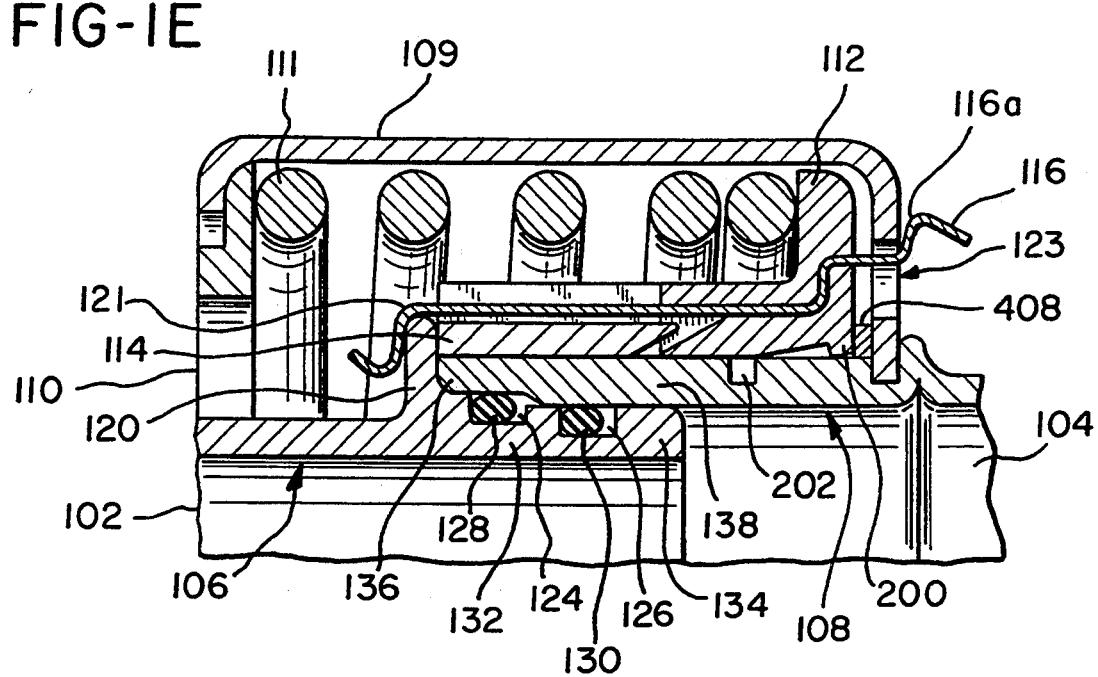

A completely coupled connector 100 is shown in FIG. 1E. The curved tab portions 116a of the latch pins 116 extend through the disconnect openings 123. The plurality of hooks 121 of the latch pins 116 hold the first connector member 106 in the second connector member 108. When fully engaged, the O-rings 124 and 126 are compressed between the two tubes 102 and 104 to produce a hermetic seal.

To disengage the two tubes 102 and 104, the curved tab portions 116a of the latch pins 116 are forced downward toward the axial center line A of the second tube 104 and 105 the first tube 102 is withdrawn. As the first tube 102 is withdrawn, the spring 111 is compressed by the interaction of the flange 120 and the hook 121 until the protrusion 200 reenters the notch 202. As the protrusion 200 is reinserted into the notch 202, the load member 112 has tilted to the position shown in FIG. 1A thus raising the hook 121 of the latch pin 116 from the flange 120. The first tube 102 can then be removed from the second tube 104.

Figure 5A:
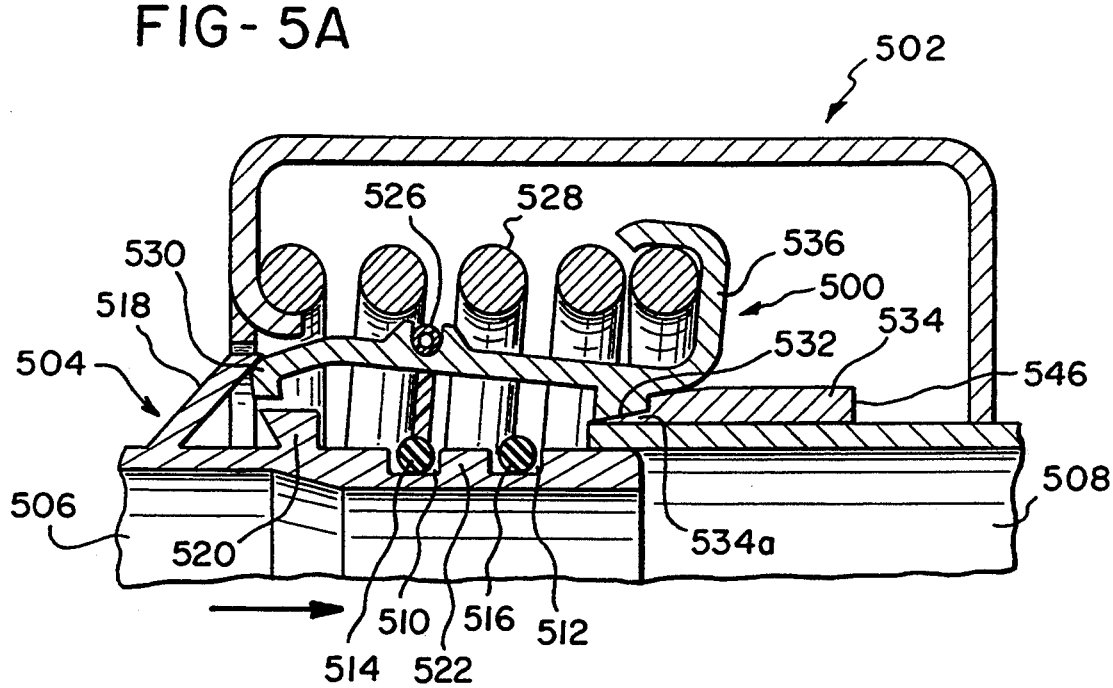
FIGS. 5A through 5F are partial, sectioned side views of a second embodiment of a connector in accordance with the present invention progressively illustrating the coupling process.

FIGS. 5A–5F illustrate the operation of a second embodiment of the present invention. FIG. 5A shows a first connector member 504 of a first tube 506 being inserted into the inner diameter of a second connector member 502 of a second tube 508. The first connector member 504 includes a pair of circumferential grooves 510 and 512 having respective O-rings 514 and 516 disposed therein for sealing the connection. An inclined flange 518 and circumferential ridge 520 act to guide each pivot arm 500 during the coupling process.

In this embodiment, a plurality of pivot arms 500 attached to a plurality of flexible connecting members are provided in a ring configuration around the second connector member 502. Each pivot arm 500 is pivotally mounted on a slidable, flexible ring 526. The pivot arm 500 is positioned so as to transfer the axial force generated by a spring 528 to the first connector member 506.

The pivot arm 500 includes an insertion hook 530 at one end which engages the inclined flange 518 of the first connector member 506. A protrusion 532 on the pivot arm 500 interacts with a raised shoulder 534 on the second connector member 508 to secure the spring 528 in the compressed position prior to insertion of the first connector member 506, guide the movement of the pivot arm 500 during coupling, and lock the pivot arm 500 in the coupled position. The raised shoulder 534 has a seat 534a for engaging the protrusion 532 when the connector 502 is in the uncoupled position. A vertical face 546 of the raised shoulder 534 locks the protrusion 532 into position when the first and second connector member 506 and 508 are fully coupled. The pivot arm 500 further includes a spring hook 536 for engaging the spring 528.

Figure 5B:
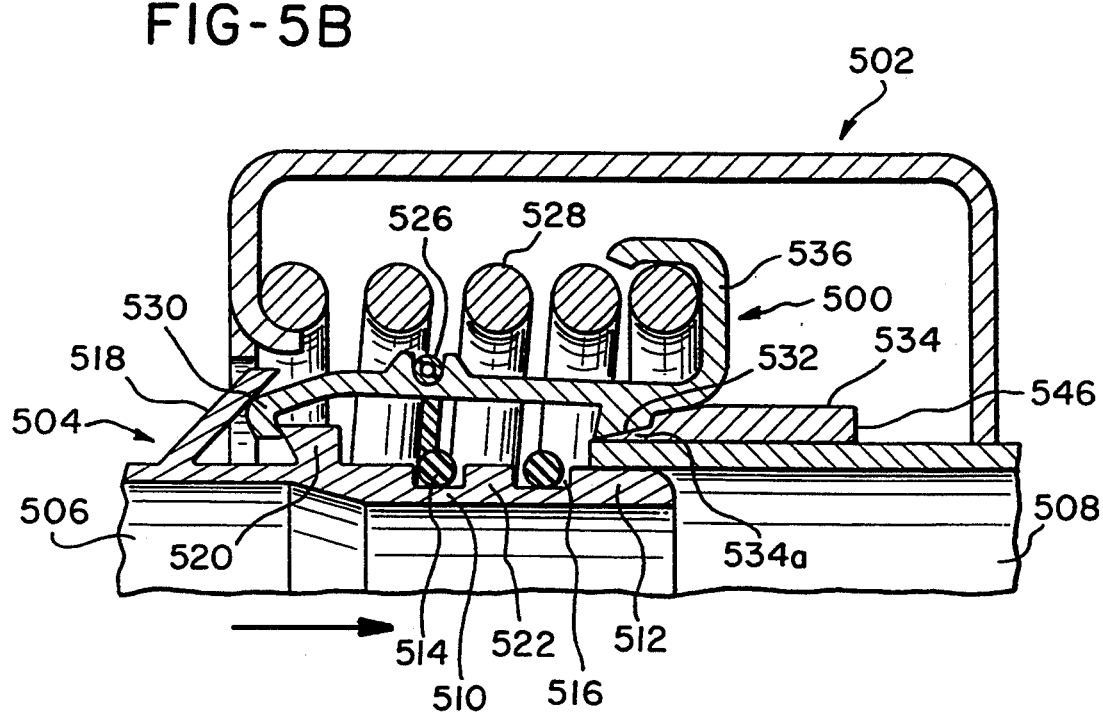
Figure 5C:
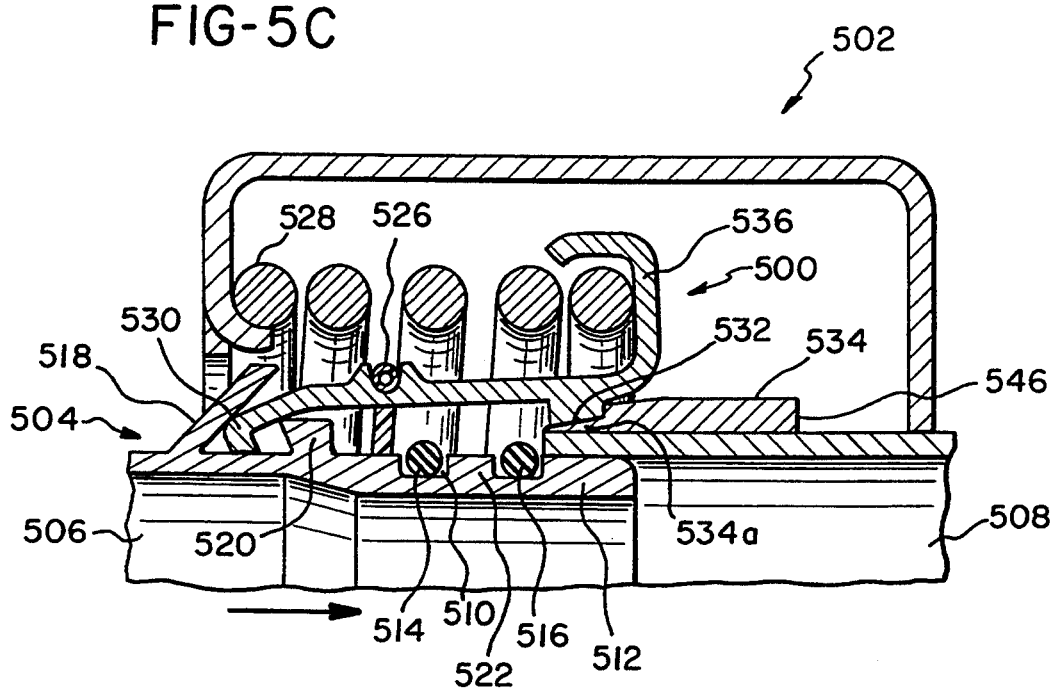
Figure 5D:
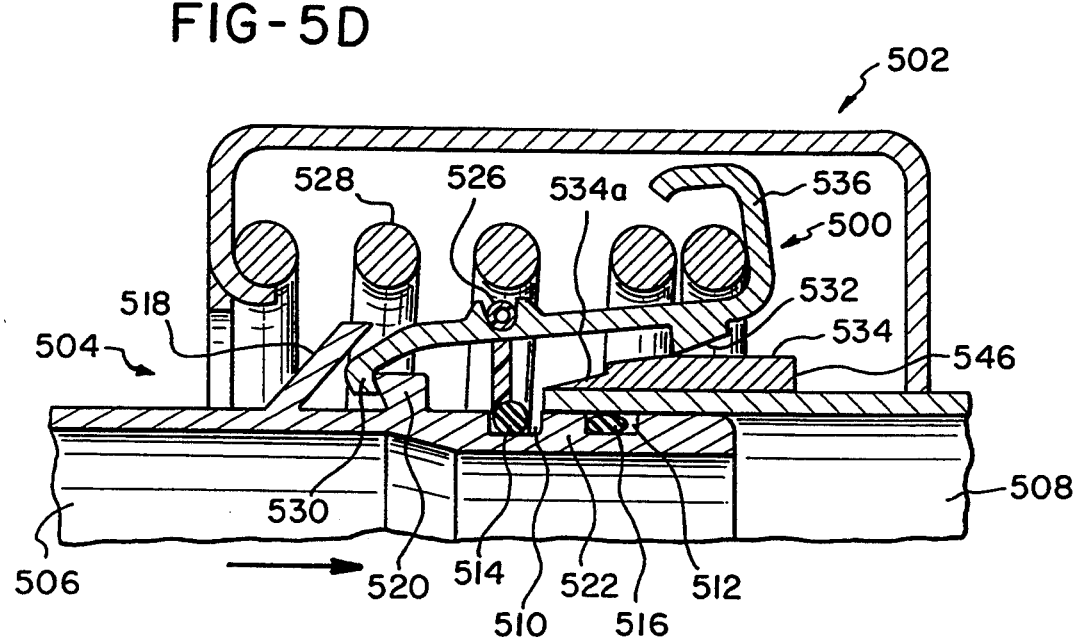
Figure 5E:
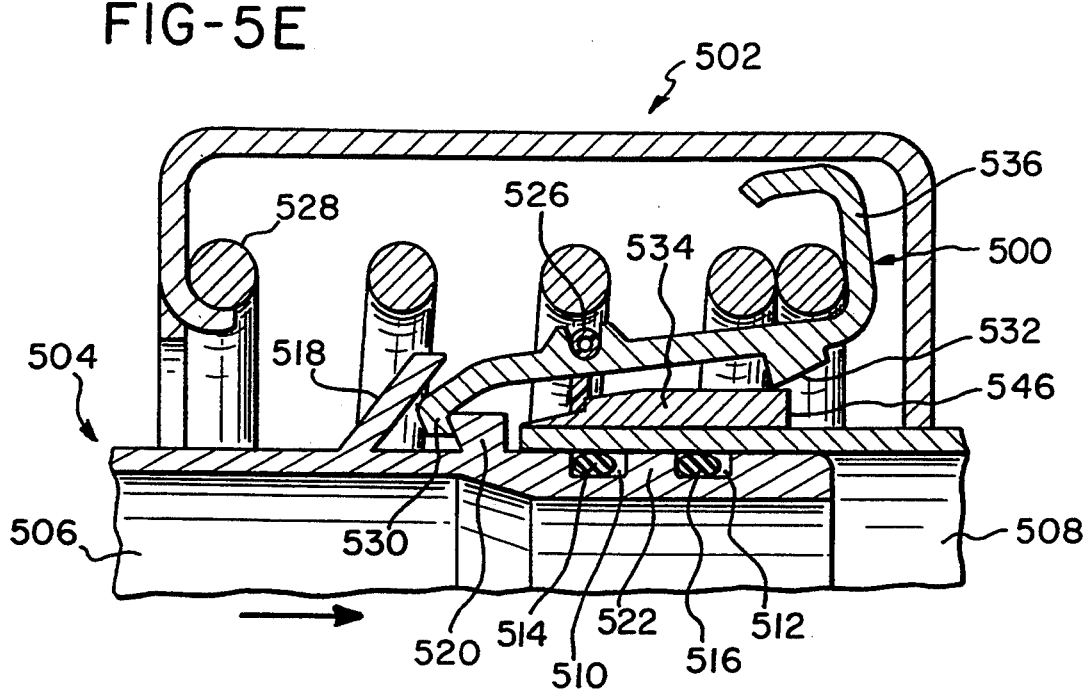

As the first connector member 506 is further inserted into the second connector member 508, as is progressively shown in FIGS. 5B and 5C, the inclined flange 518 forces the insertion hook 530 downward, thus pivoting the pivot arm 500. Eventually, the force of the inclined flange 518 causes the protrusion 532 to be lifted from the seat 534a and to travel along the face of the raised shoulder 534, as shown in FIG. 5D.

When the protrusion 532 is lifted from the seat 533, the spring 528 accelerates the pivot arm 500 along the central axis of the second connector member 508 at a rate greater than the insertion rate of the first connector member 506. Thus, as is shown in FIG. 5D, the hook 530 exerts a force against the ridge 520 of the first connector member 506. O-ring 516 is now compressed and engaged with the inner wall of the second connector member 508. As the first connector member 506 continues to be inserted into the second connector member 508, the other O-ring 514 engages the inner wall of the second connector member 508, shown in FIG. 5E. The protrusion 532 is nearing the end of its travel along the face of the raised shoulder 534.

Figure 5F:
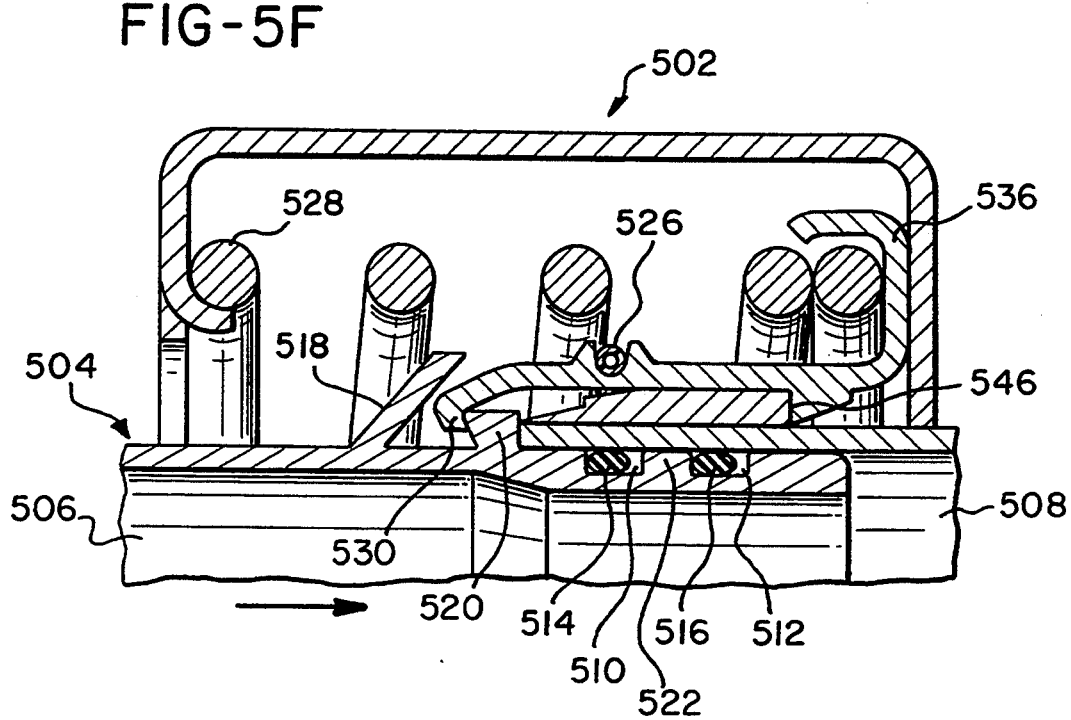

FIG. 5F shows full engagement of the first connector member 506 in the second connector member 508. The protrusion 532 abuts the vertical face 546 of the raised shoulder 534 to restrict axial movement of the pivot arm 500. Since the pivot arm 500 cannot move in the withdraw direction, the first connector member 504 is secured in the second connector member 508 by the hook 530 which contacts the ridge 520.

Having thus described the connector of the present invention in detail and by reference to preferred embodiments thereof, it will be apparent that modifications and variations are possible without departing from the scope of the invention defined in the appended claims.

What is claimed is:

1. A connector for coupling a first tube and a second tube, said connector comprising:
   a first connector member attachable to an end of the first tube and a second connector member attachable to an end of the second tube, said second connector member being adapted to receive said first connector member when introduced one into the other; and force means, attachable to one of said connector members, for applying an axial force to assist an assembler in moving said first and second connector members together upon introduction of said first connector member into said second connector member.

2. The connector as recited in claim 1 comprising locking means for locking said first connector member to said second connector member.

3. The connector as recited in claim 2 wherein said locking means comprises release means for releasing said locking means.

4. The connector as recited in claim 1 wherein said force means is attachable to said second connector member and comprises:
   a compression spring for generating said axial force; and
   translation means for transferring said axial force from said spring to said first connector member.

5. The connector as recited in claim 4 wherein said second connector member includes a circumferential notch therein, said first connector member has a circumferential flange thereon, and said translation means comprises:
   a plurality of load members each having a spring seat for receiving one end of said spring and a protrusion capable of insertion into said notch of said second connector member, prior to insertion of said first connector member, to hold said spring in a compressed position;
   a collar capable of movement along the center axis of said second tube in response to insertion of said first connector member into said second connector member, said collar having a plurality of wedge members each of which contacts an associated one of said load members to release said protrusion of said associated load member from said notch and, thereby release said compressed spring; and
   securing means for securing said members to said load flange as said spring is released whereby said load members transfer said axial force of said spring to said flange to thereby force said first connector member to couple with said second connector member.

6. The connector as recited in claim 5 wherein said securing means comprises a plurality of latch pins positioned about said second connector member, each of said latch pins having a hook for securing said flange to one of said load members upon introduction of said first connector member into said second connector member.

7. The connector as recited in claim 2 wherein said second connector member comprises a connector housing having a plurality of disconnect openings therein, and said locking means comprises a plurality of latch pins extending through a corresponding one of said plurality of disconnect openings, each of said latch pins having at least one curved tab portion for contacting a perimeter of said disconnect opening to secure said first connector member to said second connector member.

8. The connector as recited in claim 1 wherein said first connector member comprises at least one circumferential groove having at least one seal disposed therein for hermetically sealing said first connector member and said second connector member to one another.

9. The connector as recited in claim 1 wherein said first connector member comprises first and second sections, said first section having a first outer diameter and said second section having a second outer diameter;
   said second connector member comprises first and second portions, said first portion having a first inner diameter and said second portion having a second inner diameter, said second connector member being adapted to be coupled with said first connector element such that said first section is positioned substantially adjacent to said first portion and said second section is positioned substantially adjacent to said second portion; and
   said connector further comprises sealing means for sealing said first connector member to said second connector member, said sealing means being retained in one of said first and second connector members and engaging with the other of said first and second connector members when said first and second connector members are coupled to one another.

10. The connector as recited in claim 9 wherein said first inner diameter of said first portion exceeds said second outer diameter of said second section.

11. The connector as recited in claim 9 wherein said sealing means comprises a first O-ring retained on said first section.

12. The connector as recited in claim 11 wherein said sealing means further comprises a second O-ring retained on said second section.

13. The connector as recited in claim 12 wherein said first inner diameter of said first portion exceeds the outer diameter of said second O-ring retained on said second section.

14. The connector as recited in claim 9 wherein said first inner diameter of said first portion is greater than said second inner diameter of said second portion.

15. A connector for coupling a first tube and a second tube, said connector comprising:
   a first connector member attachable to an end of the first tube and a second connector member attachable to an end of the second tube, said second connector member being adapted to receive said first connector member when introduced one into the other;
   force means, attachable to said second connector member, said force means including,
      a compression spring for generating an axial force; and
      translation means for applying said axial force to assist an assembler in moving said first connector member and said second connector member together upon introduction of said first connector member into said second connector member, said axial force being sufficient to at least assist in fully engaging said first connector member and said second connector member; and
   locking means for locking said first connector member to said second connector member when said first connector member is fully engaged with said second connector member.

16. The connector as recited in claim 15 wherein said locking means comprises release means for releasing said locking means to uncouple said first tube and said second tube.

17. A method for coupling a first tube having a first connector member connected to an end thereof and a second tube having a second connector member connected to an end thereof, said second connector member being adapted to receive said first connector member when introduced one into the other, said method comprising the steps of:

attaching a force means to one of said connector members;

enabling said force means to apply an axial force that assists an assembler in moving said first and second connector members together when said first connector member is introduced into said second connector member; and introducing said first connector member into said second connector member whereby said axial force applied by said force means assists the assembler in coupling said first and second connector members.

18. The method as recited in claim 17 further comprising the step of locking said first connector member to said second connector member upon the coupling of said first and second connector members.

19. The method as recited in claim 17 wherein sale step of enabling said force means comprises the step of providing a spring connected to said second connector member to generate said axial force.

20. The method as recited in claim 17 wherein said step of enabling said force means comprises the steps of:

activating said force means in response to insertion of said first connector member into said second connector member to apply said axial force to said first connector member; and connecting said first connector member to said force means such that said axial force couples said first and second connector members.

* * * * *